United States Patent
Kishine et al.

(10) Patent No.: US 9,273,172 B2
(45) Date of Patent: Mar. 1, 2016

(54) METHOD FOR PRODUCING A FLUOROELASTOMER

(75) Inventors: Mitsuru Kishine, Osaka (JP); Masanori Kitaichi, Osaka (JP); Shigeru Morita, Osaka (JP); Yoshiki Tanaka, Osaka (JP); Daisuke Ota, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 620 days.

(21) Appl. No.: 12/168,454

(22) Filed: Jul. 7, 2008

(65) Prior Publication Data
US 2009/0036604 A1 Feb. 5, 2009

(30) Foreign Application Priority Data

Jul. 31, 2007 (JP) ................................ 2007-199961

(51) Int. Cl.
C08F 214/22 (2006.01)
C08F 2/26 (2006.01)
C08F 2/44 (2006.01)

(52) U.S. Cl.
CPC .................................. *C08F 214/22* (2013.01)

(58) Field of Classification Search
CPC ............. C08F 2/44; C08F 2/26; C08F 214/22
USPC ........................................................ 524/773
See application file for complete search history.

(56) References Cited

U.S. PATENT DOCUMENTS

| 2,999,854 A * | 9/1961 | Honn et al. ................. 525/326.3 |
| 6,509,429 B1 * | 1/2003 | Kitaichi et al. ................. 526/242 |
| 6,774,164 B2 * | 8/2004 | Lyons et al. ................... 524/157 |
| 6,972,094 B2 * | 12/2005 | Ichida et al. ................... 210/652 |
| 2007/0135546 A1 * | 6/2007 | Amin-Sanayei et al. ...... 524/386 |
| 2009/0082519 A1 | 3/2009 | Irie et al. |
| 2010/0029878 A1 | 2/2010 | Matsuoka et al. |

FOREIGN PATENT DOCUMENTS

| EP | 1514848 A1 | 3/2005 |
| GB | 823974 | 11/1959 |
| JP | 2004509993 A | 4/2004 |
| JP | 2006321797 A | 11/2006 |
| WO | 2006/118247 A1 | 11/2006 |
| WO | 2008/132959 | 11/2008 |

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

The present invention provides a method for producing a fluoroelastomer using an emulsifier which is inexpensive and hardly remains in product polymers. The present invention is related to a method for producing a fluoroelastomer, wherein vinylidene fluoride and at least one fluoroolefin monomer other than vinylidene fluoride are copolymerized in the manner of an emulsion polymerization in the presence of an emulsifier represented by $C_5F_{11}COOM$, wherein M represents H, $NH_4$ or an alkali metal.

2 Claims, No Drawings

METHOD FOR PRODUCING A FLUOROELASTOMER

TECHNICAL FIELD

The present invention relates to a method for producing a fluoroelastomer.

BACKGROUND ART

Perfluorofatty acids and derivatives thereof are widely used as emulsifiers in producing a fluoroelastomer by emulsion polymerization, and ammonium perfluorooctanoate ($C_7F_{15}COONH_4$) is used most frequently, among others. Although it is excellent in performance in emulsion polymerization, ammonium perfluorooctanoate is expensive and readily remains in product polymers in the step of coagulation, prolonging the cure time of the resulting curable rubber compositions and/or leading to inferior characteristics of final cured products; a step for sufficient washing is thus required prior to drying.

Patent Document 1 describes $C_6F_{13}CH_2CH_2SO_3M$ as an emulsifier capable of substituting for ammonium perfluorooctanoate. However, it causes changes in polymers probably due to the chain transfer reaction involving the methylene groups; hence the range of use thereof is limited.

Patent Document 2 described the use of $CF_3(CF_2)_4COO^-(NH_4)^+$ in producing tetrafluoroethylene/propylene copolymer latexes. However, it does not describe anything about the production of vinylidene fluoride-containing fluoroelastomers.

Patent Document 3 describes the use of potassium or sodium perfluorohexanoate as an emulsifier to be used in emulsion polymerization of hexafluoropropylene and vinylidene fluoride. However, it is not used in any example; what problem or problems will be encountered is not known.

[Patent Document 1] Japanese Kohyo Publication (laid open under PCT) 2004-509993
[Patent Document 2] Japanese Kokai (Laid-open) Publication 2006-321797
[Patent Document 3] British Patent No. 823974

DISCLOSURE OF INVENTION

Problems which the Invention is to Solve

In view of the above-discussed state of the art, it is an object of the present invention to provide a method for producing a fluoroelastomer using an emulsifier which is inexpensive and hardly remains in product polymers.

Means for Solving the Problems

The present invention provides a method for producing a fluoroelastomer, wherein vinylidene fluoride and at least one fluoroolefin monomer other than vinylidene fluoride are copolymerized in the manner of an emulsion polymerization in the presence of an emulsifier represented by $C_5F_{11}COOM$, wherein M represents H, $NH_4$ or an alkali metal.

In the following, the invention is described in detail.

The production method of the invention comprises carrying out the emulsion polymerization in the presence of an emulsifier represented by $C_5F_{11}COOM$ (in which M represents H, $NH_4$ or an alkali metal) to produce a fluoroelastomer. The emulsifier mentioned above is highly soluble in water and is readily dissolved in the aqueous phase in the step of coagulation, so that it hardly remains in the product fluoroelastomer. Therefore, the production method of the invention makes it possible to obtain a fluoroelastomer low in residual emulsifier concentration and curable with ease.

The emulsifier represented by $C_5F_{11}COOM$ has such advantages as mentioned above but on the other hand it cannot be said to be always sufficient in emulsifying capacity; therefore, it has been regarded as being not always preferred as an emulsifier for use in producing fluororesins or fluoroelastomers by emulsion polymerization. More specifically, it cannot effectively increase that number of emulsified particles in the emulsion which greatly influences the rate of polymerization in emulsion polymerization. For example, in the case of the polymerization for producing tetrafluoroethylene/propylene copolymers as shown in Patent Document 2, it is a problem that the polymerization time required is very long. In the emulsion polymerization for producing specific fluoroelastomers in the practice of the invention, however, the emulsion polymerization can be carried out smoothly using the emulsifier represented by $C_5F_{11}COOM$.

The emulsifier represented by $C_5F_{11}COOM$ is very highly soluble in water and can be dissolved in water to a concentration of 50% by mass or higher, whereas ammonium perfluorooctanoate cannot be dissolved in water at levels exceeding 20% by mass. Further, the metal salt thereof itself presumably formed on the occasion of coagulation is characteristically higher in solubility in water as compared with ammonium perfluorooctanoate.

The above emulsifier is preferably added in an amount corresponding to 100 to 5000 ppm of the aqueous medium. When the above emulsifier is used in an amount smaller than the amount corresponding to 100 ppm of the aqueous medium, the number of polymer particles generated at the initial stage of polymerization becomes extremely small and the progress of the reaction becomes slow and, therefore, the production efficiency may become decreased and, further, the emulsion-stabilizing effect may not be produced. On the contrary, even when the amount of the above emulsifier is larger than the amount corresponding to 5000 ppm of the aqueous medium, the rate of polymerization will not rise any longer but the washing in the subsequent treatment step may become difficult in some instances. Although the above emulsifier is used in a relatively large amount in the production method of the invention, the emulsifier is highly soluble in water and therefore can be readily removed from the product fluoroelastomer and can even be recycled. The level of addition of the above emulsifier is preferably not lower than 500 ppm and not higher than 4000 ppm.

The production method of the invention comprises copolymerizing vinylidene fluoride [VdF] and a fluoroolefinic monomer other than VdF in the presence of the above-mentioned emulsifier to produce a fluoroelastomer.

As the fluoroolefinic monomer other than VdF, there may be mentioned tetrafluoroethylene [TFE], hexafluoropropylene [HEP], perfluoro(alkyl vinyl ether)[PAVEs], chlorotrifluoroethylene [CTFE], vinyl fluoride [VF] and the like and, further, monomers containing a cure site to be involved in the crosslinking reaction of the fluoroelastomer, for example an iodine or bromine atom or a nitrile group.

The fluoroolefinic monomer other than VdF preferably comprises at least one monomer selected from the group consisting of tetrafluoroethylene [TFE], hexafluoropropylene [HEP] and perfluoro(alkyl vinyl ether) [PAVEs]. Preferred among the PAVEs is perfluoro(methyl vinyl ether).

The production method of the invention is further applicable to the case of copolymerization with a hydrocarbon olefin as a comonomer. The hydrocarbon olefin is not particularly restricted but includes ethylene, propene [Pr] and the like; propene is preferred, however.

As the above-mentioned fluoroelastomer, there may be mentioned, for example, VdF/HFP copolymers, VdF/TFE/HFP copolymers, VdF/TFE/CTFE copolymers, VdF/TFE/PAVE copolymers and VdF/TFE/Pr copolymers, among others.

The VdF unit content in the fluoroelastomer is preferably 10 to 80% by mass of all monomer units. The "VdF unit", so referred to herein, constitutes a part of the molecular structure of the fluoroelastomer and is the VdF-derived moiety represented by the formula —($CH_2$—$CF_2$)—, and the term "all monomer units" means all monomer-derived moieties in the molecular structure of the fluoroelastomer. The VdF unit content can be determined by $^{19}$F-NMR measurements.

The emulsion polymerization in the practice of the present invention can be carried out in an aqueous medium in the presence of the emulsifier and one or more of various additives. As the additives, there may be mentioned chain transfer agents, polymerization initiators and buffering agents, among others. The aqueous medium is preferably deionized high-purity pure water.

When the above emulsion polymerization is carried out in the presence of a chain transfer agent, the molecular weight and molecular weight distribution of the product fluoroelastomer can be adjusted. As the chain transfer agents, there may be mentioned saturated hydrocarbons containing 1 to 6 carbon atoms, ketones containing 3 to 5 carbon atoms, mercaptans containing 10 to 12 carbon atoms, esters such as ethyl acetate and diethyl malonate, and the like and, among them, saturated hydrocarbons containing 1 to 6 carbon atoms, such as methane, ethane, propane and isopentane, are preferred.

Mention may also be made of iodine-containing compounds and bromine-containing compounds, which will be described later herein.

The polymerization initiator mentioned above may be a water-soluble radial polymerization initiator. Preferred as the water-soluble radical polymerization initiator are those which generate a —COOH group at the initiation end; commonly used are water-soluble inorganic compound- or water-soluble organic compound-derived peroxides, such as persulfate salts such as ammonium persulfate and potassium persulfate, bissuccinoyl peroxide, bisglutaroyl peroxide and the like. These may be used singly or two or more of them may be used in combination. The —COOH group generation at the initiation end preferably renders the product fluoroelastomer self-emulsifiable, whereby the stability of the latex is still more improved.

For carrying out the polymerization in a low-temperature range, a redox system initiator is preferably used. Further, it is also possible to use a water-insoluble organic peroxide and/or an azo compound, at a level at which the stability of the latex will not be threatened, either alone or in combination with a water-soluble inorganic compound or water-soluble organic compound peroxide.

The level of addition of the above polymerization initiator can be properly selected according to the composition of the product fluoroelastomer composition, the yield, the polymerization temperature, the polymerization pressure and other factors. The addition level is preferably 0.01 to 0.5 part by mass, more preferably 0.03 to 0.4 part by mass, per 100 parts by mass of the fluoroelastomer to be produced.

The emulsion polymerization may be carried out in a batchwise, semibatchwise or continuous manner of operation. A semibatchwise manner of operation is preferred, however.

In the above emulsion polymerization, the fluorinated monomer, polymerization initiator, chain transfer agent and other ingredients may be additionally fed during the polymerization reaction according to the desired composition and yield of the fluoroelastomer.

The emulsion polymerization is generally carried out while maintaining the temperature within the range of 10 to 120° C. When the temperature is lower than 10° C., it is impossible to attain an effectively high rate of reaction on an industrial scale and, when it is higher than 120° C., the reaction pressure for maintaining the polymerization reaction becomes high and the reaction can no longer be maintained.

The emulsion polymerization is generally carried out while maintaining the pressure within the range of 0.5 to 10 MPa. A preferred lower limit to the pressure is 0.7 MPa, and a preferred upper limit thereto is 6.2 MPa. When the pressure is lower than 0.5 MPa, the monomer concentration in the polymerization reaction system becomes too low to attain a satisfactory rate of reaction; hence, a long period of time is required until completion of the polymerization. Further, the product fluoroelastomer may fail to have a sufficiently high molecular weight in some instances. For attaining a pressure higher than 10 MPa, the pressure retaining mechanism becomes expensive.

When the emulsion polymerization is carried out in a semi-batchwise manner, the desired polymerization pressure can be attained in the initial stage of polymerization by adjusting the monomer gas amounts at the initial stage of feeding and, after the start of the reaction, the pressure is adjusted by adjusting the additional monomer gas feed rates. When the above polymerization is carried out in a continuous manner, the polymerization pressure is adjusted by adjusting the back-pressure in the exit pipe for the aqueous fluoroelastomer dispersion produced. The above polymerization is generally carried out for about 24 to 300 hours.

The production method of the invention preferably comprises the step (A) of carrying out emulsion polymerization using a persulfate salt and the step (B), following the step (A), of carrying out emulsion polymerization using an organic peroxide. When the method comprises the above-mentioned step (A) and step (B), it is possible to improve the curability of the product fluoroelastomer and provide the cured product with improved characteristics.

According to the production method of the invention, the emulsion polymerization is carried out in the presence of an emulsifier represented by $C_5F_{11}COOM$ (in which M represents H, $NH_4$ or an alkali metal) and, therefore, the number of polymer particles formed in the emulsion as a result of polymerization tends to be smaller as compared with the use of ammonium perfluorooctanoate. The use of a persulfate salt in the initial stage of polymerization, namely the step (A), the persulfate-due —COOH terminus stabilizes the polymer particles. Therefore, the persulfate is preferably used in a fairly large amount and a large number of polymer particles can be formed even in the presence of the emulsifier mentioned above.

In the step (A), the number of polymer particles formed is preferably not smaller than $1\times10^{12}$ (per cubic centimeter of the aqueous medium), more preferably $1\times10^{13}$ to $1\times10^{16}$, still more preferably $1\times10^{14}$ to $1\times10^{15}$. The number of polymer particles in step (A) can be adjusted by adjusting the levels of addition of the emulsifier and persulfate salt, controlling the rate of stirring and adjusting the monomer concentrations, among others. The polymer particles produced in the step (A) preferably have an average particle diameter of 30 to 300 nm, more preferably 40 to 200 nm. When the average particle diameter is larger than 300 nm, the average particle diameter in the emulsion obtained after step (B) becomes too great and, as a result, the stability of the emulsion is jeopardized and such a problem as increased polymer adhesion to the polymerization vessel may possibly occur. When it is smaller than 30 nm, the particles may possibly become unstable in the step (B).

Further, the step (A) is followed by the step (B) of carrying out emulsion polymerization using an organic peroxide and, thereby, the polymer terminal COOH group content due to the persulfate salt can be reduced and the characteristics of the product fluoroelastomer in curing and the physical properties of the curing product can be improved.

The organic peroxide is preferably an oil-soluble peroxide; as such, there may be mentioned, for example, dialkyl peroxycarbonates such as diisopropyl peroxydicarbonate and di-sec-butyl peroxydicarbonate, peroxy esters such as tert-butyl peroxyisobutyrate and tert-butyl peroxypivalate, dialkyl peroxides such as di-tert-butyl peroxide and, further, di(ω-hydrododecafluoroheptanoyl)peroxide, di(ω-hydrotetradecafluoroheptanoyl)peroxide, di(ω-hydrohexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chlorohexafluorobutyryl)peroxide, di(ω-chlorodecafluorohexanoyl)peroxide, di(ω-chlorotetradecafluorooctanoyl)peroxide, ω-hydrododecafluoroheptanoyl ω-hydrohexadecafluorononanoyl peroxide, ω-chlorohexafluorobutyryl ω-chlorodecafluorohexanoyl peroxide, ω-hydrododecafluoroheptanoyl perfluorobutyryl peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, di(undecachlorodotriacontafluorodocosanoyl) peroxide and like di[perfluoro- (or fluorochloro)acyl] peroxides.

The production method of the invention may also comprise the step (A) of emulsion polymerization using a water-soluble radical polymerization initiator and the step (C) of emulsion polymerization in the presence of an iodine compound or bromine compound, which step follows the step (A).

When the production method of the invention comprises the step (A) and the directly following step (C) in which emulsion polymerization is carried out in the presence of an iodine compound or bromine compound, the fluoroelastomer obtained has a highly active iodine atom or bromine atom at a polymer terminus, so that the characteristics thereof at the time of curing and the physical properties of the curing product can be improved.

Usable as the iodine compound or bromine compound are compounds represented by the general formula:

$$R(I)_x(Br)_y$$

wherein R is a saturated or unsaturated divalent fluorinated hydrocarbon group or divalent chlorinated and fluorinated hydrocarbon group containing 1 to 16 carbon atoms or a saturated or unsaturated divalent hydrocarbon group containing 1 to 3 carbon atoms and x and y each is 0, 1 or 2 provided that x+y=2). Examples are 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, monoiodo- and monobromo-substituted, diiodo- and monobromo-substituted, monoiodo- and dibromo-substituted and (2-iodoethyl)- and (2-bromoethyl)-substituted benzenes differing in substituent positions. These compounds may be used either singly or in combination. Among them, 1,4-diiodoperfluorobutane is preferred in view of its reactivity in polymerization, reactivity in crosslinking and availability, among others.

The level of addition of the iodine compound or bromine compound is preferably 0.01 to 1% by mass relative to the total mass of the fluorine-containing monomers.

The radical polymerization initiator to be used in the step (C) includes those water-soluble radical polymerization initiators mentioned above and, among them, ammonium persulfate (APS) is preferred.

The fluoroelastomer obtained by the production method of the invention may be in any form provided that it is the product obtained by the above-mentioned manner of polymerization; thus, it may be an aqueous dispersion of the fluoroelastomer as polymerized or may be used in the form of gum or crumbs as obtained from the aqueous dispersion just after polymerization in the conventional manner by coagulation and drying, for instance. The emulsifier to be used according to the production method of the invention can improve the stability of the emulsion and is preferably used in such a mode of polymerization as mentioned above in which scarcely water-soluble substances, for example an initiator such as an organic peroxide and a chain transfer agent such as an iodine compound or bromine compound are added during the polymerization process, as mentioned above.

The gum mentioned above consists of small granular fluoroelastomer pieces, and the crumbs mentioned above are lumps without a particular shape as resulting from fusion of small granules of the fluoroelastomer failing to retain the granular form as gum at room temperature.

The above fluoroelastomer can be processed into a fluoroelastomer composition by adding a curing agent, a filler, etc.

The curing agent may be a polyol, polyamine, organic peroxide, organotin, bis(aminophenol), tetramine or bis(thioaminophenol), for instance.

The above fluoroelastomer composition is based on the fluoroelastomer mentioned above and therefore is substantially emulsifier-free and is excellent in that it can be readily crosslinked on the occasion of molding/processing.

Fluoroelastomer moldings can be obtained by carrying out a molding/processing procedure using the above fluoroelastomer. The method of molding/processing is not particularly restricted but may be any of the methods known in the art and carried out using such a curing agent as mentioned above.

The fluoroelastomer moldings are suited for use as seals, gaskets, electric wire coverings, hoses, tubes, laminates and the like and, in particular, they are suited for use as semiconductor manufacturing apparatus parts and automotive parts, among others.

Effects of the Invention

The production method of the invention makes it possible to drive the polymerization to completion in a stable manner and, further, produce fluoroelastomers low in residual emulsifier content.

BEST MODES FOR CARRYING OUT THE INVENTION

The following examples illustrate the present invention in further detail. These examples are, however, by no means limitative of the scope of the invention. In the examples and comparative examples, "part(s)" and "%" respectively mean "part(s) by mass" and "% by mass", unless otherwise specified.

(1) Solid Matter Content (P %) in Aqueous Dispersion

Each aqueous dispersion sample (X g) was heated at 150° C. for 3 hours and the solid matter content was calculated based on the weight of the residue on heating (Z g), as follows: P=Z/X×100 (%).

(2) Determination of Emulsifier Content in Polymer After Drying

Each fluororubber sample was dissolved in acetone, the solution was dropwise added to deionized water, and the solid precipitate was removed. The thus-obtained solution was concentrated at 80° C., allowed to cool and subjected to liquid chromatography (LC). The following apparatus was used.
Apparatus: Waters model Alliance 2695 separation module
Detector: Waters model 2487 UV detector
Column: Tosoh TSKgel ODS-120T, 4.6 mm in diameter×150 mm in length

EXAMPLE 1

A 6-liter polymerization vessel made of SUS stainless steel was charged with 3273 ml of pure water and then with 16.4 g of a 500 aqueous solution of $C_5F_{11}COONH_4$ (solid matter: 2500 ppm based on pure water) and, after evacuation and nitrogen substitution, a monomer mixture composed of vinylidene fluoride, tetrafluoroethylene and hexafluoropropylene with a monomer composition of 44/16/40 mole percent was fed into the vessel under pressure until arrival of the pressure at 1.52 MPa and, with stirring at 280 rpm, 0.14 ml of isopentane and a solution of 0.51 g of ammonium persulfate in 4 ml of pure water were fed into the vessel to initiate the polymerization.

At the time when the pressure was found reduced to 1.42 MPa, the pressure was raised to 1.52 MPa by feeding a 58/20/22 mole percent monomer mixture of vinylidene fluoride, tetrafluoroethylene and hexafluoropropylene. This procedure was repeated and, at the time of arrival of the weight of the monomers fed at 1210 g, the monomer feeding was suspended, the gaseous monomers in the polymerization vessel were blown off, the vessel was cooled, and the contents were taken out. The dispersion recovered weighed 4483 g and had a white color.

The polymerization time was 7.6 hours, and the solid content was 26.0% by weight. The polymer adhering to the stirring blade and the like weighed 0.2 g (in wet condition). The dispersion was treated with an ammonium sulfate solution for coagulation, followed by drying without washing; the $C_5F_{11}COONH_4$ content in the polymer was assayed and found to be 185 ppm.

EXAMPLE 2

A 6-liter polymerization vessel made of SUS stainless steel was charged with 3273 ml of pure water and with 13.1 g of a 50% aqueous solution of $C_5F_{11}COONH_4$ (solid content: 2000 ppm based on pure water) and, after evacuation and nitrogen substitution, the pressure was raised to 1.52 MPa by feeding a mixed gas composed of vinylidene fluoride and hexafluoropropylene (70/30 mole percent) and, with stirring at 280 rpm, 0.1 ml of isopentane and a solution of 0.86 g of ammonium persulfate in 4 ml of pure water were fed into the vessel to initiate the polymerization.

At the time when the pressure was found reduced to 1.42 MPa, the pressure was raised to 1.52 MPa by feeding a 78/22 mole percent monomer mixture of vinylidene fluoride and hexafluoropropylene. This procedure was repeated and, at the time of arrival of the weight of the monomers charged at 572 g, the temperature was lowered to 60° C. and, at the time of arrival of the pressure at 1.03 MPa, 28.7 g of a 40% (by weight) solution of diisopropyl peroxydicarbonate in $HCF_2CF_2CH_2OH$ was fed into the vessel under nitrogen pressure. At the time when the pressure was found reduced to 0.92 MPa, the pressure was raised to 1.03 MPa by feeding a 78/22 mole percent gas mixture of vinylidene fluoride and hexafluoropropylene, and this procedure was repeated. At the time of arrival of the weight of the monomers fed at 1430 g, the monomer feeding was discontinued, the gaseous monomers in the polymerization vessel were blown off, the vessel was cooled, and the contents were taken out. The dispersion recovered weighed 5297 g and had a white color.

The polymerization time was 4.6 hours, and the solid content was 26.9% by weight. The polymer adhering to the stirring blade and the like weighed 7 g (in wet condition). The dispersion was treated with an ammonium sulfate solution for coagulation, followed by drying without washing; the $C_5F_{11}COONH_4$ content in the polymer was assayed and found to be 110 ppm.

Comparative Example 1

The procedure of Example 1 was followed in the same manner except that 16.35 g of a 20% aqueous solution of $C_7F_{15}COONH_4$ (solid matter: 1000 ppm based on pure water) was used in lieu of the 50% aqueous solution of $C_5F_{11}COONH_4$, the gaseous monomers in the polymerization vessel were blown off, the vessel was cooled, and the contents were taken out. The dispersion recovered weighed 4502 g and had a white color.

The polymerization time was 7.2 hours, and the solid content was 26.1% by weight. The polymer adhering to the stirring blade and the like weighed 0.1 g (in wet condition). The dispersion was treated with an ammonium sulfate solution for coagulation, followed by drying without washing; the $C_7F_{15}COONH_4$ content in the polymer was assayed and found to be 339 ppm.

Comparative Example 2

The procedure of Example 2 was followed in the same manner except that 16.35 g of a 20% aqueous solution of $C_7F_{15}COONH_4$ (solid matter: 1000 ppm based on pure water) was used in lieu of the 50% aqueous solution of $C_5F_{11}COONH_4$, the gaseous monomers in the polymerization vessel were blown off, the vessel was cooled, and the contents were taken out. The dispersion recovered weighed 5321 g and had a white color.

The polymerization time was 4.7 hours, and the solid content was 26.1% by weight. The polymer adhering to the stirring blade and the like weighed 1.1 g (in wet condition). The dispersion was treated with an ammonium sulfate solution for coagulation, followed by drying without washing; the $C_7F_{15}COONH_4$ content in the polymer was assayed and found to be 791 ppm.

INDUSTRIAL APPLICABILITY

The production method of the invention is utilizable in the production of fluoroelastomers suited for use as seals, electric wire coverings, tubes, laminates and so forth.

The invention claimed is:

1. A method for producing a vinylidene fluoride/tetrafluoroethylene/hexafluoropropylene elastomer, comprising step (A) of copolymerizing vinylidene fluoride, tetrafluoroethylene, hexafluoropropylene in the manner of an emulsion polymerization in the presence of an emulsifier represented by $C_5F_{11}COONH_4$, wherein the level of addition of the emulsifier is not lower than 500 ppm and not higher than 4000 ppm, and the polymerization is initiated by a water-soluble radical polymerization initiator.

2. The method for producing a vinylidene fluoride/tetrafluoroethylene/hexafluoropropylene elastomer according to claim 1, further comprising step (B), following the step (A), of carrying out further emulsion polymerization using an organic peroxide.

* * * * *